United States Patent [19]
Hemmat et al.

[11] 3,771,970

[45] Nov. 13, 1973

[54] METHOD OF PRODUCING CADMIUM TELLURIDE CRYSTALS

[75] Inventors: Naim Hemmat, Lexington; Fritz V. Wald, Marlboro, both of Mass.

[73] Assignee: Tyco Laboratories, Inc., Waltham, Mass.

[22] Filed: Feb. 2, 1970

[21] Appl. No.: 7,834

[52] U.S. Cl. .......................... 23/304, 23/305, 23/50, 23/301 SP

[51] Int. Cl. .......................... B01j 17/14, C01g 11/00

[58] Field of Search ................ 23/300, 301 SP, 305, 23/50 R, 308 R, 304

[56] References Cited

UNITED STATES PATENTS

| | | | |
|---|---|---|---|
| 2,747,971 | 5/1956 | Hein | 23/301 |
| 3,174,823 | 3/1965 | Kopelman | 23/305 |
| 3,268,297 | 8/1966 | Fischer | 23/301 |
| 3,362,795 | 1/1968 | Weisbeck | 23/305 |
| 3,385,656 | 5/1968 | Aven | 23/300 |
| 3,484,302 | 12/1969 | Maeda et al. | 23/301 |
| 3,494,730 | 2/1970 | Tai et al. | 23/50 |
| 3,546,027 | 12/1970 | Hurle et al. | 23/301 |

FOREIGN PATENTS OR APPLICATIONS

| | | | |
|---|---|---|---|
| 919,048 | 2/1963 | Great Britain | 23/305 |

*Primary Examiner*—Wilbur L. Bascomb, Jr.
*Assistant Examiner*—R. T. Foster
*Attorney*—Schiller & Pandiscio

[57] ABSTRACT

Method of producing bulk crystals of cadmium telluride involving growth from solution in a selected solvent such as tellurium.

17 Claims, 1 Drawing Figure

PATENTED NOV 13 1973 3,771,970
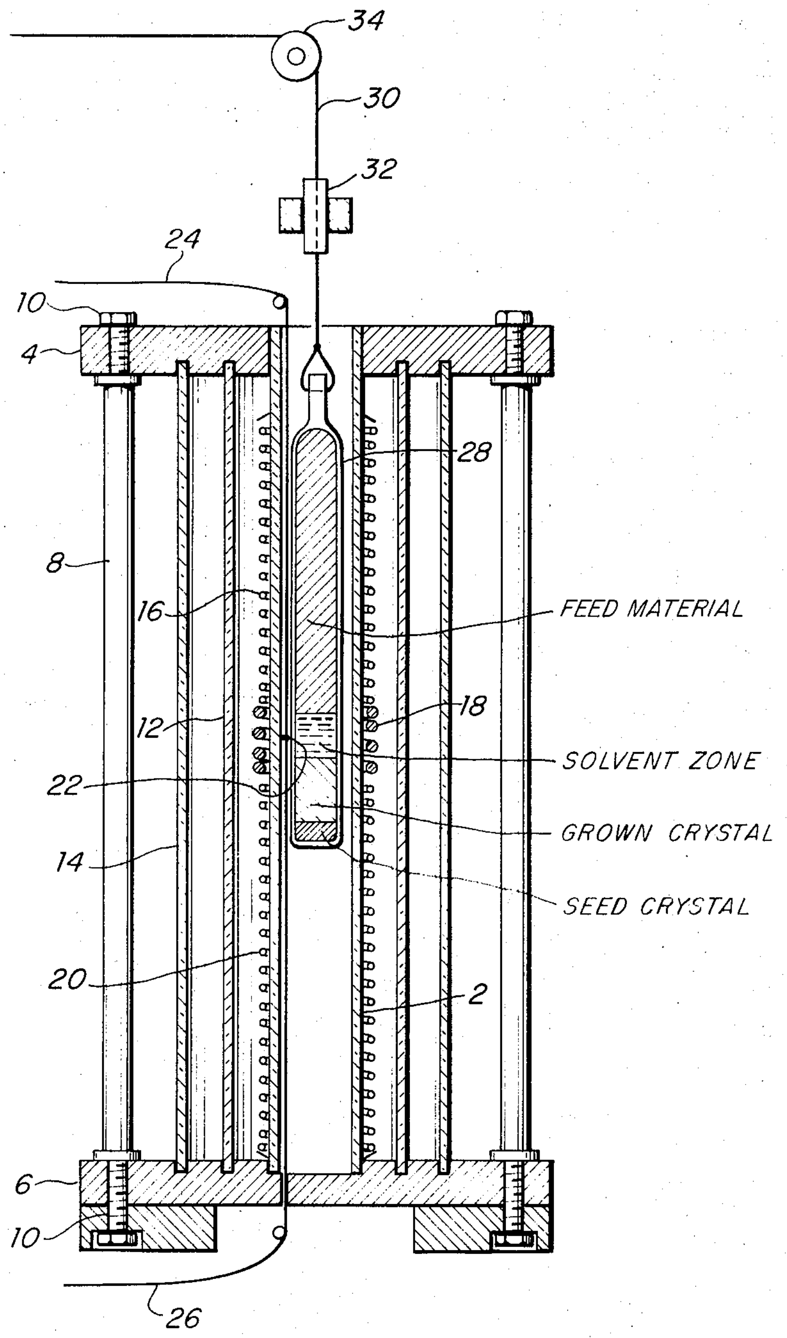
NAIM HEMMAT
FRITZ V. WALD
INVENTORS.
BY Schiller & Pandiscio
ATTORNEYS.

METHOD OF PRODUCING CADMIUM TELLURIDE CRYSTALS

This invention relates to a crystallization process and more particularly to a method of producing bulk cadmium telluride crystals.

As is well known bulk cadmium telluride crystals are useable for making a variety of solid state devices. Pure crystalline cadmium telluride may be used in Gamma ray detectors while the doped variety have utility in making high temperature semi-conductor devices or solar cells.

Crystalline bodies of cadmium telluride must meet a number of requirements in order to be suitable for electronic applications. Thus for radiation detectors it is essential that the bulk crystal be pure, essentially free of imperfections, and have a high electrical resistivity. Since cadmium telluride exhibits maximum electrical resistivity when the ratio of cadmium to tellurium is unity, it is desirable to grow cadmium telluride crystals of stoichiometric composition.

Heretofore, bulk cadmium telluride crystals have been grown by melt growth techniques in which crystallization occurs at its melting point of 1,092°C. This prior art technique has several disadvantages, particularly in growing bulk crystals for radiation detectors. For one thing, it is difficult to achieve crystals of uniform or precise stoichiometric proportions. For another thing, certain impurities, notably copper, are not easily segregated and thus remain as electrically active impurities in the final crystal. Additionally the high growth temperature causes dislocations in the crystal lattice and promotes absorption of impurities from the melt container. A further limitation is difficulty in quantitatively controlling "doping" of the crystal with selected additives for selected semiconductor applications. Hence the prior art method is unsatisfactory for use on a commercial basis because of its inherent limitation of lack of precise or predictable control of electronic properties.

Accordingly the object of this invention is to provide a new method of producing bulk crystals of cadmium telluride which avoids or substantially diminishes the problems attendant to the prior art method of growing such crystals for the melt.

A more specific object is to provide a method of growing bulk cadmium telluride in substantially monocrystalline form which involves crystallization at a temperature substantially below 1,092°C and is adapted to produce crystals of predictable composition.

A further object is to provide a method of producing bulk substantially monocrystalline cadmium telluride with improved electronic and structural properties and which is substantially free of copper and other electrically active impurities.

Essentially the present invention consists of growing crystalline cadmium telluride by passing a limited amount of a suitable solvent material through a cadmium telluride feed charge. The solvent, which preferably is tellurium, is caused to migrate through the feed charge by imposing relative movement between a heater and the feed charge. The solvent migration involves dissolution of feed material at the advancing (hotter) liquid-solid interface and crystallization of the dissolved feed at the trailing (cooler) liquid-solid interface. Because the process involves dissolution of feed material in the solvent, it requires a substantially lower operating temperature than the prior art method of growing from a melt. The process also lends itself to initiating growth from a seed crystal.

Other features and attendant advantages of the invention are set forth in the following detailed description which is to be considered together with the accompanying drawing of one form of apparatus used to grow bulk crystalline cadmium telluride.

In practicing the invention, relatively pure and dense cadmium telluride source material is employed. Preferably a supply of source material is prepared by reacting Cd and Te of the highest purity commercially available (nominally 99.999$^+$ percent). The cadmium telluride source material is synthesized by placing stoichiometric amounts of elemental Cd and Te in a carbonized quartz vessel. The carbon coating on the vessel prevents adhesion to the crucible and the picking up contamination from the quartz crucible. This particularly reduces residual oxygen in the charge. The crucible is evacuated, preferably to about $10^{-5}$ torr and sealed. Then the crucible is placed in a furnace and the temperature of the furnace gradually raised to 850°C where it is held for 2 to 4 hours. Then the temperature is raised to about 1,120°C and held there for about 30 minutes, after which it is cooled back to room temperature. The solid synthesized CdTe does not adhere to the crucible and is easily removed. This supply of relatively pure source material, which is in the form of an ingot, could be used as feed material for crystal growth, without removing the ingot from its container, or is then remelted in another evacuated and sealed quartz crucible or in an inert environment, e.g., in the presence of argon or helium, and then cast into dense ingots of suitable size. While not necessary, it is preferred that the ingot density be as close to 100 percent as possible so as to avoid absorption of liquid solvent through capillary action of structural voids. Using a dense ingot also minimizes the occasional detachment of the liquid solvent from the source material during crystal growth.

Preferably the process is practiced by moving the charge relative to a stationary heat source. Referring now to the drawing the apparatus for carrying out the preferred mode of the process consists mainly of a stationary heating chamber in which the feed material and solvent are disposed, a stationary heat source, and means for moving the feed material relative to the heat source.

More specifically, the furnace shown in the drawing comprises a cylindrical quartz muffle 2 which is supported by top and bottom base plates 4 and 6 made of a suitable high temperature material such as Transite. A plurality of standoff tubes 8 and bolts 10 hold the base plates fixed. The bottom end of muffle 2 is sealed in and closed off by base plate 6 while its upper end is open. Also mounted between plates 4 and 6 are two additional quartz tubes 12 and 14 which act as thermal barriers to prevent loss of heat by convection currents and radiation. Surrounding the quartz muffle are three electrical resistance heating coils 16, 18 and 20. The upper heating coil 16 is relatively long and is operated as a preheater. The center heating coil 18 is relatively short and is operated as the solvent zone heater. The bottom heating coil 20 is also relatively long and is operated as an after-heater. The ends of the three heating coils are brought out of the furnace through quartz tubes 12 and 14 to suitable variable electrical power supplies (not shown) which are adapted to supply variable heating currents. The furnace also includes a temperature monitoring thermocouple 22 disposed within the muffle 2 proximate to the solvent zone heater 18. One lead 24 of the thermocouple is brought out of the open top end of the muffle, while its other lead 26 is brought out of the bottom end of the muffle via a suitable opening in bottom base plate 6. These thermocouple leads are connected to conventional electrical temperature indicating and controlling means (not shown).

The feed material and solvent are contained in a sealed quartz ampoule 28 which is inserted into the muffle via its open top end. The ampoule is suspended by a nichrome wire 30 which passes through a hollow guide tube 32 over a pulley 34 to a motorized bi-directional variable speed drive (not shown) which can be set to raise or lower the cable at any desired speed. Tube 32 acts to guide wire 30 so as to keep the ampoule centered in muffle 12. In the drawing the ampoule 28 is shown in the position that it would occupy after the growth process has proceeded for a while.

The drawing also indicates that the original contents of the ampoule included a seed crystal. However, it is to be understood that while use of a seed crystal is preferred, it is not necessary to the process and may be omitted. In this connection it is to be noted that preferential grain growth which leads to a self-seeding effect has been observed in CdTe ingots grown according to this invention. In nearly all cases of ingots grown without seeding, the preferential grain growth direction was determined by LAUE X-Ray diffraction to be the <110> direction. This is in contrast to the <111> direction reported for CdTe crystals grown from the melt. If a seed crystal is used the orientation is not critical.

As mounted in the furnace for crystal growth the ampoule initially contains a dense ingot of relatively pure CdTe disposed on top of a suitable amount of solvent material and, optionally, a seed crystal below the solvent material. The ampoule is filled as full as possible to minimize dead space and is evacuated to a suitable vacuum level, preferably about $10^{-5}$ torr, before being sealed. Optionally the ampoule may be backfilled with a suitable inert atmosphere before sealing. By way of example but not limitation, the inert atmosphere may be either argon or helium. Once the ampoule has been sealed, it is mounted in the furnace and lowered through the heating muffle at a selected speed to effect crystal growth. The same crystal growth effect can be realized by initially having the solvent layer on top of the feed ingot and moving the charged ampoule upward (instead of downward) relative to the stationary heater. In this procedure the starting position of the solvent zone is slightly below the middle heater 18.

The composition versus temperature phase equilibrium determines the optimum growth temperature for an ingot of selected composition and the growth rate is determined by the liquid diffusion of the constituent species through the solvent material. It has been found that to grow CdTe ingots of stoichiometric composition using tellurium as the solvent, the temperature of the solvent zone should be maintained in the range of 500°–800°C and preferably between about 700° and 750°C. CdTe ingots of non-stoichiometric composition can be produced by operating at higher temperatures, e.g. as high as 950°C.

The invention also offers the option of producing CdTe ingots that are substantially monocrystalline or are homogenously polycrystalline. As used herein the term "substantially monocrystalline" denotes an ingot which consists of a single crystal or as many as four or five crystals. In practice it is possible to control the process so that the ingots consist of a single crystal or bi- or tri- crystals. It is to be noted that ingots with as many as four or five grains may be suitable for use as gamma ray detectors if their electrical resistivity is sufficiently high. Whether the ingot produced is substantially monocrystalline or polycrystalline is determined primarily by the speed at which the solvent zone migrates through the feed charge. Single crystals are formed at lower speeds and homogenous polycrystalline ingots are formed at higher speeds. To grow a substantially monocrystalline CdTe ingot it is necessary to move the tellurium solvent zone, i.e., move the ampoule relative to the stationary heater 18, at a speed in the range of about 0.1 to 0.9 centimeters per day. Polycrystalline ingots can be produced by increasing the speed to about 1.0 to 3.5 cm./day.

Tellurium is the preferred solvent material since is has been shown to be effective in removing certain impurities such as copper which appear in melt-grown CdTe. Other materials which may be used as solvents are gold, silver, lead, tin, or bismuth. Gold and silver are particularly suitable where it is desired to dope the crystal since both materials are electronic activators for CdTe.

In this connection it is well known that desirable electronic properties appear when the balance of electrical charges in ultrapure electronic chemicals is disturbed by the presence of imperfections which may take the form of point defects or be caused by the incorporation of foreign atoms (activators) in the molecule. The present invention offers the advantage of doping either by introduction of a selected dopant (i.e., activator) or by the presence of native point defects. A selected copant such as copper, gold or silver may be introduced into the solvent in a suitable amount determined by its segregation coefficient for the grown crystal to have the desired semiconductor properties. Native point defects may be produced by operating with an average solvent zone temperature above 800°C, in which case the grown crystal is non-stoichiometric and is characterized by point defects in the form of cadmium vacancies.

The following example illustrates how substantially monocrystalline CdTe ingots of stoichiometric composition may be grown according to the present invention.

EXAMPLE

An ingot of dense polycrystalline CdTe made by reaction of Cd and Te in a carbonized crucible as above described was placed into a cylindrical quartz ampoule. The ampoule had an interior diameter of 1.5 cm. and an interior length of about 15 cm. and the ingot was sized to substantially fully fill the ampoule. Approximately 10 grams of pure tellurium was placed on top of the feed ingot. The ampoule was then evacuated to $10^{-5}$ torr and sealed by fusion while still under vacuum. Then the ampoule was mounted in a furnace constructed as shown in the drawing so that the layer of solvent was below the feed ingot. The ampoule was positioned so that the solvent zone was just above the level of the solvent heater 18. Then the three heaters 16, 18 and 20 were energized. The power inputs to the heaters were adjusted so that the temperature in the region of heaters 16 and 20 was about 250°C and the temperature in the region of heater 18 was about 700°C. After the temperature of the solvent and feed material had reached the mentioned temperatures, the motor was started to lower the ampoule in the heating muffle. The ampoule was lowered at the rate of 0.75 cm./day. As the ampoule moved down through the hot zone established by heater 18, the layer of solvent melted to form a molten solvent zone with a thickness of about 1 cm. With continued downward movement of the ampoule, the lower end of the ingot in the hot zone was dissolved by the molten solvent. As the lower end of the ampoule passed out of the hot zone, a thermal gradient was established across the solvent zone with the result that the dissolved species at the hotter upper end of the solvent zone diffused through the solvent zone and were recrystallized out of the cooler lower end of the same zone. In this way the solvent zone effectively migrated through the feed ingot, progressively causing dissolution of CdTe at the upper liquid-solid interface and crystallization of CdTe at the lower liquid solid interface. The process was continued until all of the feed charge had recrystallized and the last-formed part of the crystalline product had been exposed to the 250°C temperature zone of heater 20 for about 3 hours. Then the heaters were shut off and the ampoule cooled to room temperature. The CdTe ingot was removed from the ampoule and examined after removal of the solvent from its last-formed end. It had a diameter of about 1.5 cm. and a length of slightly less than 15 cm. It was found to be a single crystal grown along the <110> direction, copper-free, and of stoichiometric composition. It was found to have an average carrier concentration, as determined by capacity measurements of wafers sliced therefrom, in the range between $5 \times 10^9$ to $10^{12}$ $cm^{-3}$, indicating that it was semi-insulating.

It is to be noted that the use of heaters 16 and 20 is preferred but not essential. Heater 16 serves merely to preheat the feed ingot, while heater 20 anneals the product ingot.

The method of growing bulk CdTe crystals using a seed crystal is the same as in the foregoing example except that the seed is introduced into the ampoule with the solvent initially placed between it and the feed ingot.

The thickness, i.e., height, of the solvent zone may vary, but preferably the solvent zone has a thickness of about 1–2 cm.

Although in the example set forth above the heater was stationary and the feed charge moved through the heater, it is to be recognized that the same results can be achieved by holding the ampoule stationary and moving a heater along the ampoule to cause migration of the solvent zone. Still other modifications and variations of the process will be obvious to persons skilled in the art by the foregoing description.

The process is essentially the same using a solvent material other than tellurium, except that the optimum operating temperature for producing an ingot of selected composition, e.g., stoichiometric composition, may be different as determined by the composition versus temperature phase equilibrium for CdTe and the particular solvent material.

We claim:

1. Method of growing crystalline cadmium telluride comprising the steps of providing in a sealed container a mass of cadmium telluride and a layer of a solvent material which in molten form will dissolve said mass at a temperature below the melting point of cadmium telluride, said solvent being a member of the class consisting of tellurium, gold, silver, lead, tin and bismuth, placing said container in proximity to a heater and heating said solvent material with said heater to a temperature above its melting point and below the melting point of cadmium telluride so as to form a molten solvent zone, and providing relative movement between said container and said heater at a rate such as to cause said molten solvent zone to migrate through said mass by dissolving cadmium telluride on one side of said zone and recrystallizing dissolved cadmium telluride at the other side of said zone.

2. Method according to claim 1 wherein said solvent material is tellurium.

3. Method according to claim 2 wherein said solvent zone is maintained at a temperature within the range of 500°–950°C.

4. Method according to claim 3 wherein said solvent zone is maintained at a temperature within the range of 500°–800°C.

5. Method according to claim 2 wherein said solvent zone is maintained at a temperature within the range of about 700°C to about 750°C.

6. Method according to claim 3 wherein said zone migrates through said mass at a speed not in excess of about 0.9 cm./day.

7. Method according to claim 5 wherein said zone migrates through said mass at a speed within the range of about 0.1 to about 0.9 cm./day.

8. Method according to claim 1 wherein said mass is polycrystalline and the dissolved cadmium telluride crystallizes out of said solvent zone as a substantially monocrystalline body.

9. Method according to claim 2 further including initially providing a seed crystal in said container with said layer of tellurium disposed between said seed crystal and said mass, and further wherein the cadmium telluride dissolved in said solvent zone recyrstallizes onto said seed.

10. Method of producing a bulk cadmium telluride crystal comprising the steps of placing a mass of polycrystalline CdTe in a container together with a discrete layer of tellurium, evacuating and sealing said container, placing said container into a furnace having a first relatively hot zone with a temperature between about 500°C and 950°C and a second relatively cold zone with a temperature below 500°C, melting said layer of tellurium by positioning said container so that said layer is within said relatively hot zone, and providing relative movement between said container and said first and second zones at a rate and in a direction such as to cause said layer to migrate through said mass by progressively dissolving cadmium telluride on one side of said layer and recrystallizing dissolved cadmium telluride on the opposite side of said layer.

11. Method according to claim 10 wherein said relative movement is achieved by moving said container along said furnace.

12. Method according to claim 10 wherein said first zone has a temperature of about 500°C to about 800°C.

13. Method according to claim 10 wherein said first zone has a temperature of between about 700° and 750°C.

14. Method according to claim 13 wherein said relative movement is at the rate of about 0.1 and 0.9 cm/day.

15. Method according to claim 10 wherein said layer has a thickness when melted of about 1 cm.

16. Method of claim 10 wherein said relative movement is at a rate of about 0.1 to 3.5 cm./day.

17. Method according to claim 10 further including a seed crystal in said container with said layer disposed between said seed and said mass, whereby as said layer moves through said mass said dissolved cadmium telluride will recrystallize on said seed.

* * * * *